54-51. SR
-18-75 CR RE28364

3484510
Re. 28,364

March 18, 1975 M. L. CORAZZA

METHOD FOR FORMING FOAM ARTICLES

Original Filed July 9, 1965 2 Sheets-Sheet 1

INVENTOR.
MARSHALL L. CORAZZA
BY
Stanton T. Holly
ATTORNEY

METHOD FOR FORMING FOAM ARTICLES

Original Filed July 9, 1965 2 Sheets-Sheet 2

INVENTOR.
MARSHALL L. CORAZZA
BY
Stanton T. Holley
ATTORNEY

United States Patent

Re. 28,364

Reissued Mar. 18, 1975

28,364

METHOD FOR FORMING FOAM ARTICLES

Marshall L. Corazza, Glen Mills, Pa., by Scott Paper Co., Philadelphia, Pa., assignee Original No. 3,484,510, dated Dec. 16, 1969, Ser. No. 470,776, July 9, 1965. Application for reissue June 13, 1973, Ser. No. 369,487

Int. Cl. B29d *27/00*

U.S. Cl. 264—51 5 Claims

Matter enclosed in heavy brackets [ ] appears in the original patent but forms no part of this reissue specification; matter printed in italics indicates the additions made by reissue.

ABSTRACT OF THE DISCLOSURE

Process for forming a solidified thermoplastic cellular foam body by heating the same to render it deformable without destroying the cellular structure thereof and simultaneously applying vacuum to opposed faces thereof to decrease the density of said body and to provide accurate conformation of said body to the walls of a mold cavity within which said body is confined.

*RELATED APPLICATIONS*

Figure 1:
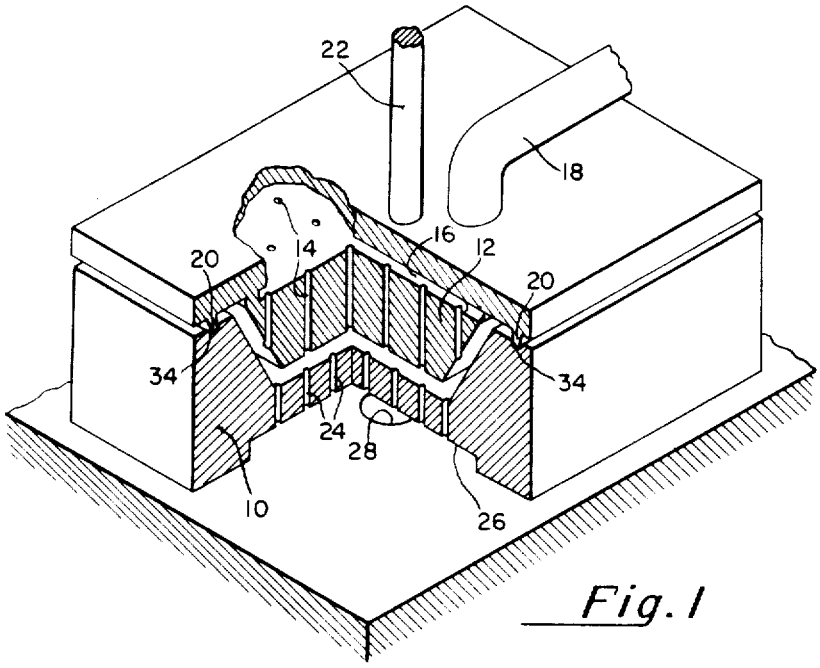

*This is an application for reissue of U.S. Pat. No. 3,484,510, granted Dec. 16, 1969 on an application for Method for Forming Foam Articles, Ser. No. 470,776, filed July 9, 1965.*

This invention relates to foam fabrication and, more particularly, to a new and improved method for thermoforming bodies of solidified, thermoplastic, generally closed cell, foam into useful objects.

In the past, many methods have been employed to form plastic articles from foam stock, such as standard vacuum forming, vacuum-pressure forming, and more recently, blow molding techniques. Moderate but limited success has been achieved with such processes, it being understood that only limited shapes, dimensions and measure of surface detail could be achieved in employing either of the above methods.

With foams, and especially those of a lower density, it is extremely difficult to regulate the reheating of the foam to a thermoplastic condition without collapse of the cellular structure. Naturally, use of any of the presently-known pressure forming techniques usually results in flattened or crushed cells and thin spots in the final structure, unless an inordinate amount of care is employed. All of the foregoing therefore indicates that any article formed from foam in this manner will have a greater resulting density than that of the foam from which it is made, as a result in part of the above crushing during forming.

However, in order to form surface detail in a molded foam article, it is necessary that considerable pressure be created between a molding surface outlining the article to be formed and the foam. While such pressure has been achieved by ordinary methods, such as press forming the article or vacuum forming from only one side, limited success has been achieved in obtaining detail on both sides of, or over the entire surface of, an article. Furthermore, in the former processes, while achieving some detail on one side or part of the surface of a foam body, the foam tends to be crushed. Not only is the appearance of the resulting article damaged, but also the density of the foam material forming the article is increased. This is generally undesirable since the primary reasons for constructing an article from foam is low material cost and weight, while achieving high strength and good rigidity. With the latter process, there is a lack of any sharp detail on the side or portions of the foam body, opposite to where a vacuum is applied. Obviously, as with any cellular structure, rigidity is lost with reduction in thickness and corresponding increase in density.

It is an object of the present invention to provide a novel method for forming articles from foam whereby the density of the article formed is lower than the density of the original foam.

It is a further object of the present invention to provide a method for forming articles from foam which provides sharp detail over substantially the entire surface of said article.

Figure 2:
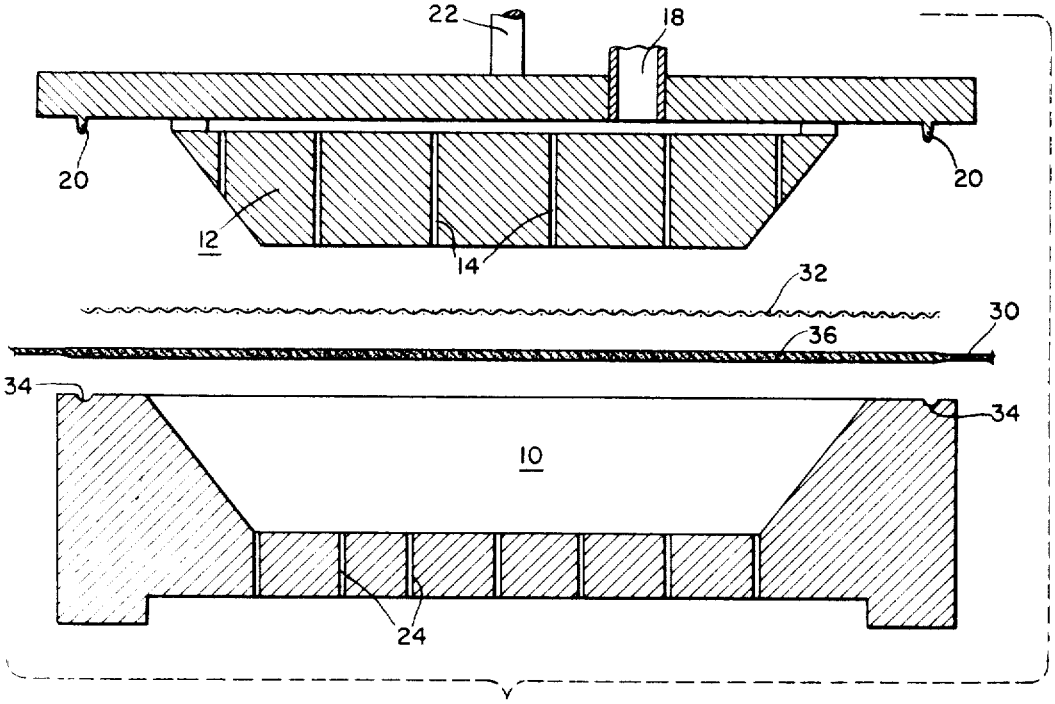
Figure 3:
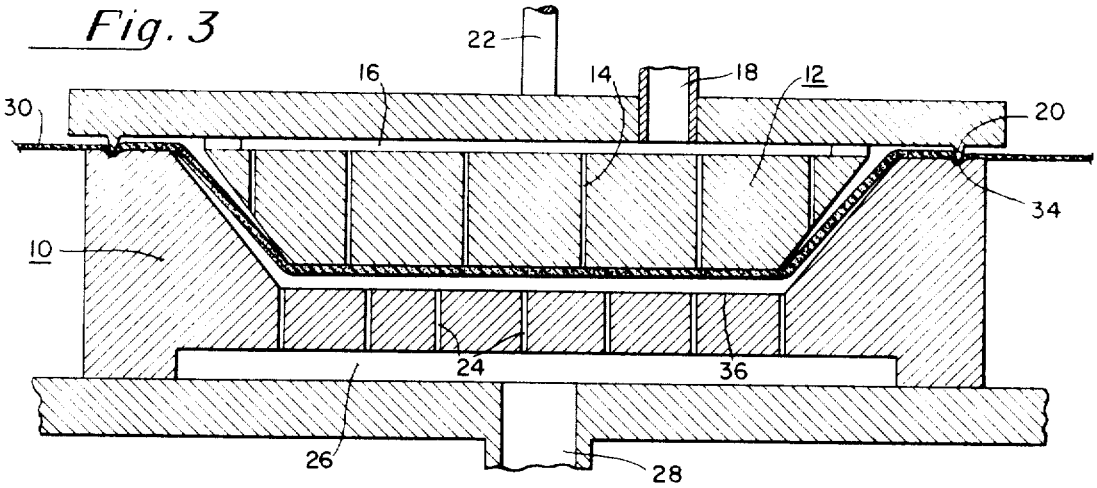
Figure 4:
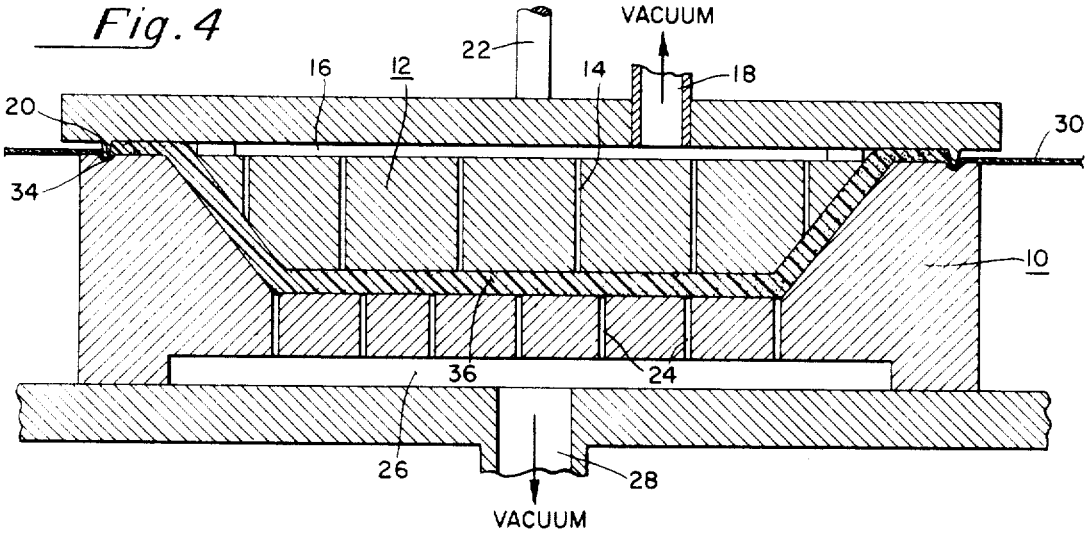
Figure 5:
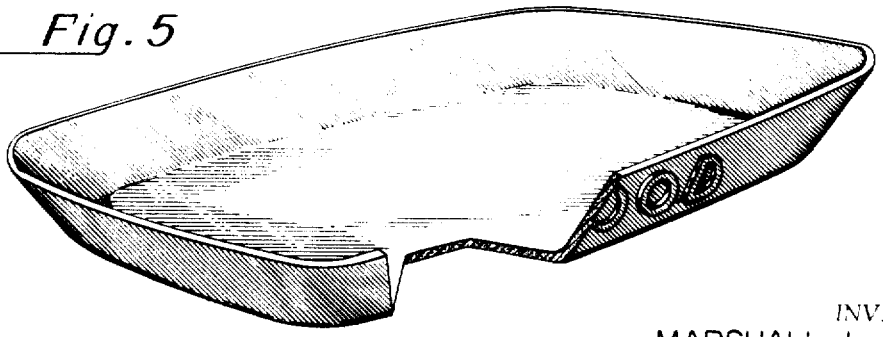

Additional objects and advantages of the present invention will become apparent from the following detailed description thereof, taken in view of the drawings, in which:

FIGURE 1 shows a perspective view of apparatus capable of performing the method of the invention; and FIGURES 2, 3, and 4 are schematic elevation views, partly in section, of apparatus capable of carrying out the method of the invention, illustrating in successive views the various steps in the process; and FIGURE 5 is a perspective view of an article formed in accordance with the invention, illustrating the surface detail formed therein.

The present invention provides a method for forming articles from foam bodies such as a sheet of solidified thermoplastic foam and makes it possible to impress an increased amount of surface detail into the one or both surfaces of the resulting article. It also makes it possible to form a foam article having a definite size and shape and, in the case of relatively flat, thin-walled articles, provides for a uniformly thick wall. Primarily, the present invention achieves these advantages by creating pressure between substantially the entire surface of the foam body and the molding surfaces by means of vacuum.

Ordinary vacuum forming of a foam sheet by applying vacuum to one side of the sheet has long been employed to shape foamed articles from a sheet of foam. In this former process, the vacuum does all of the shaping operation and a product results having substantially no surface detail on one side thereof. Furthermore, the density cannot be decreased to the degree desired to give the necessary reduction in cost as well as insulation and rigidity advantages.

In the method of the invention, a body of foam is heated to a forming temperature, enclosed within a cavity having a volume greater than the volume of the foam body and which defines by surface detail the shape of a desired article, and then substantially its entire outside surface is subjected to a partial vacuum. By maintaining the partial vacuum until the article achieves rigidity, the resulting article has extremely fine detailed surface features over its entire surface and possesses lower density and greater rigidity per unit of weight.

No one seems to have previously conceived of the idea, or the advantages to be obtained thereby, of subjecting substantially the entire surface of a foam body or both sides, in the case of a foam sheet, to a partial vacuum so as to press such foam into intimate contact with a forming surface. Also, by previously known methods, pressure tends to crush the foam. However, by the method of the invention any effects of crushing which occurs prior to or during such operation can be reduced or eliminated since the partial vacuum applied simultaneously to the entire surface would tend to draw these out.

Thus, it seems to be this step of exposing substantially the entire outside surface of the body of foam to a vacuum, parts of which may have been previously partially crushed, which eliminates any effects of crushing in the resulting expanded foam article. The article resulting from the process has its entire surface smoothly formed and accurately portrays any desired surface detail. For example, if a flat type of container is desired, surface detail will be present on both the interior and the exterior surfaces. Also, in such case, the wall thickness of the article would have much greater uniformity than would an article formed by ordinary vacuum forming.

The temperature to which the foam body must be heated initially must be sufficiently high to enable a shaped article to be formed from the foam body and preferably is high enough to allow the material forming the cells of the foam to be deformed by the pressure of gas trapped within each cell when the foam is subjected to a partial vacuum. It will be apparent to one skilled in the art that the temperature necessary depends upon the length of the thermoplastic material comprising the foam as well as the degree of vacuum created around the foam. It would be possible to perform the method of the invention by employing a relatively high temperature and a vacuum only slightly below atmospheric pressure providing care were taken not to heat the foam so high that the cells deteriorated and collapsed. On the other hand, it will be apparent that it would be possible to elevate the temperature of the foam only slightly and subject it to a partial vacuum or pressure substantially less than that of atmospheric pressure. It should also be pointed out that the temperature necessary depends upon the length of time and amount of deformation required to form the article. The determination of these temperature ranges is well within the abilities of a man skilled in the fabrication of foam articles, after determining the above criteria.

However, for polystyrene foam material, it has been found preferable to initially heat sheet foam having a thickness of from about .020 to .50 inch to a temperature of between about 220° and 280° F. Such sheet foam is moldable by the method of the invention to form a shallow container having a substantially uniform wall thickness and a high degree of surface detail when substantially its entire surface or both sides of the sheet were subjected to a vacuum of from about 630 to 740 millimeters of mercury.

Obviously other types of generally closed cell foam materials could be employed with equal success, such as polyethylene foams providing that the foams have good thermoforming characteristics and will retain their shape upon cooling. The shape of the foam product can be quite variable. However, it will be apparent that when a sheet material is employed to form an article having substantially uniform thickness, heating of the foam can be fairly rapid while still achieving substantial uniformity of heating. It should be stated here, however, that the body of foam employed should preferably conform approximately to the shape of the finally desired article. If an object such as a sphere is to be formed, a molded lump of solidified, thermoplastic, generally closed cell, foam would preferably be employed in the process.

Theoretically, however, the method of the invention may be employed to form practically any shape of article from any shape of initial body of thermoplastic, generally closed cell, foam provided, however, that sufficient care is taken in heating the body of foam up to forming temperature and a sufficient vacuum is employed to cause the gas trapped within the cells of the foam to fully expand the foam body into contact with the outlining surface of the mold.

Referring now to the drawings, FIGURE 1 shows a schematic view of apparatus which may be employed to form one type of article by means of the invention. Thus, a two-part mold is shown having a female portion 10 and a male portion 12. Male portion 12 has a plurality of vacuum ports 14 extending from its inside surface inwardly of portion 12 into a common cavity 16 in the interior of male portion 12 and connecting to a conduit 18 which leads to a vacuum pump (not shown). Male portion 12 has a sealing rim or flange 20 extending around its entire outside periphery. A thrust member 22 is attached to end of male portion 12 and arranged to reciprocate male portion 12 into coincidence with female portion 10.

Female portion 10 has a plurality of vacuum ports 24 extending from its inside surface inwardly of portion 10 to a common interconnecting cavity 26 which connects to a conduit 28 also connected to a vacuum pump (not shown). In certain instances, depending upon the pore sizes of the foam being formed and other factors, it may be necessary to provide a pattern of fine interconnecting line passages recessed into the surface of male portion 12 and female portion 10 to prevent the formation of air pockets being sealed off during evacuation of the air or creation of the partial vacuum or to prevent the failure to completely remove the air from adjacent the foam article and the molding surface. Such line passages may be arranged in a pattern or design so as to be of ornamental or functional use in the resulting article. In most cases, no such lines have been at all required, and the method of the invention has been very satisfactorily performed.

In the same respect, this will depend in part upon the distance by which vacuum ports 24 are spaced apart from each other, respectively. Such vacuum ports are preferably of extremely small diameter or cross-sectional area to inhibit suction of foam material in a thermoplastic condition into vacuum ports 14 and 24 by means of the respective vacuum pumps (not shown). For example, a vacuum port having a circular cross-section with a diameter of 1/32" has been very satisfactory. Such ports have been distributed throughout the molding surface in a concentration of from one port to every two square inches of surface, and upward. It has been found preferable to increase the concentration of such vacuum ports in areas where greater expansion of the foam body is required to conform it to the mold outline and press it into contact with the molding surface.

The upper edge of female portion 10 has a recessed channel 34 which coincides and receivably mates with sealing flange 20 on male portion 12.

Referring now to FIGURES 2, 3, and 4, which illustrate apparatus of FIGURE 1 in different stages of operation, the method of the invention will be described in detail. FIGURE 2 shows the male mold portion 12 withdrawn and spaced apart from the female mold portion 10 and a sheet of solidified thermoplastic foam material 30 being radiantly heated by means of a separate electrical element heating unit 32. FIGURE 3 illustrates the position of the apparatus after the sheet of foam has been inserted between the male and female portion of the mold and then slightly deformed into the approximate shape of the desired article by means of movement of the male portion 12 toward and into coincidence with the female mold portion 10. Sealing flange 20 on male portion 12 fits into a recessed mating channel 34 around the outside edge of female portion so as to sever the portion 36 of sheet 30 from the parent roll of foam material. The pressure of rim 20 into recessed sealing channel 34 with a layer of foam between also serves to effectively seal the cavity enclosed by the male and female portions of the mold from the outside atmosphere.

FIGURE 4 illustrates the condition of foam portion 36 after vacuum has been simultaneously applied on each side or substantially the entire surface of foam portion 36 by means of respective vacuum pumps (not shown), acting through vacuum ports 14 and vacuum ports 24. In this manner foam sheet portion 36 is drawn into pressure contact with each forming surface of the male and female mold portions, 10 and 12, creating sharp detail in each surface thereof.

FIGURE 5 illustrates one useful type of article which can be formed by the method of the invention. The article is made of foam, has much lower density than that of the original foam material and yet possesses much higher rigidity. The surface detail, smoothness and freedom from irregularities possessed by articles such as this formed by the method of the invention have not been obtainable previously by any of the known techniques.

The cells of an article formed by the method of the invention will generally contain a certain amount of gas at a pressure which may be greater than atmospheric or less than atmospheric depending in part upon certain factors, such as the degree of partial vacuum applied to the exterior surface as well as the temperature to which the foam is initially heated prior to expansion and the degree of expansion. The gas is not critical and may comprise any one of the commercial blowing agents such as carbon dioxide or pentane. It will in any case be the same gas employed in the formation of the original foam and the cells therein.

The following tables of data illustrate the striking physical properties possessed by the materials resulting from employing the method of the present invention.

TABLE I

| | Thickness, inch | Density, #/ft.³ |
|---|---|---|
| Sample 1: | | |
| Base sheet | .110 | 14.8 |
| Heated sheet | .115 | 10.9 |
| Molded part | .165 | 7.5 |
| Sample 2: | | |
| Base sheet | .060 | 9.5 |
| Heated sheet | .095 | 7.8 |
| Molded part | .130 | 4.9 |

TABLE II.—COMPARATIVE FLEXURAL STRENGTH

| | Bending load, in./lbs. | Thickness, inch |
|---|---|---|
| Sample 3: | | |
| Base sheet | 1.0 | .107 |
| Heated sheet | 2.0 | .1285 |
| Molded part | 6.0 | .1645 |
| Sample 4: | | |
| Base sheet | 2.0 | .057 |
| Heated sheet | 2.0 | .0755 |
| Molded part | 6.0 | .1365 |

Table I illustrates the reduction in density and corresponding increases in the thickness of a foam article from the original sheet of foam material, and Table II illustrates the tremendous increase in flexural strength or resistance to bending load possessed by materials formed in accordance with the method of the invention as compared with the flexural strength of the original foam sheet material.

The flexural test employed in obtaining the above results consisted of clamping various sheets from each sample, having a width of 1 inch over a fulcrum and applying weights at incremental distances spaced from the fulcrum until each tested strip failed or bent 90°. The sheet designated as "base sheet" was in each case a sheet of solidified, thermoplastic, generally closed cell, polystyrene foam. The sheet designated as "heated sheet" was the above sheet which had been heated to forming temperature and cooled again. As shown, some natural expansion occurred. The sheet designated as "molded part" was a sample taken from an article formed in accordance with the invention from the "base sheet."

In the practice of the present invention, several additional economic advantages have become apparent. It is well known that the production rates or extrusion rates possible for lower density foams are much lower than those obtainable with higher density foams. Therefore, the use of the method of the invention allows the production of an article of the desired low density from a foam having a higher density and therefore increases the overall rate of production.

For example, in order to form a flat container such as a tray having a density of 6 pounds per cubic foot, by conventional vacuum forming methods, foam sheet material having a density of 8 or 9 pounds per cubic foot would normally be required. However, by the method of the invention, the same tray having a density of 6 pounds per cubic foot could be made from foam sheet material having a density of 13 or 14 pounds per cubic foot. The production of foam sheet material having a density of 13 or 14 pounds per cubic foot is very much more rapid than that having a density of 8 or 9 pounds per cubic foot.

A similar advantage is present with respect to the time required to heat foam sheet material to thermoforming temperature because the superior insulating properties of a foam sheet having a density of 8 or 9 pounds per cubic foot required that it be heated for a longer period of time than the foam sheet having a density of 13 or 14 pounds per cubic foot.

From the above description, it can be seen that various modifications can be made in the details of the invention without departing from the spirit thereof. Therefore, it is intended that the claims not be limited by the above description and examples.

What is claimed is:

[1. A process for forming a solidified body comprising a sheet of thermoplastic, closed cell, foam material having opposed faces comprising the steps of:

(1) heating said sheet to render the same deformable without destroying the cellular character thereof;

(2) confining said sheet in a cavity defined by opposed male and female members;

(3) mechanically deforming said sheet to generally assume the configuration of said cavity; and (4) simultaneously applying vacuum to said opposing faces to cause said sheet to expand and to closely assume the configuration of said cavity.]

2. A process as set forth in claim [1] 7, wherein said heating is accomplished by the application of radiant energy.

3. A process as set forth in claim [1] 7, including the further step of cooling said sheet to rigidify the same in the expanded condition.

4. A process as set forth in claim [1] 7, wherein said material comprises polystyrene.

[5. A process for thermoforming a body comprising a sheet of solidified, thermoplastic closed cell foam material, comprising the steps of:

(1) heating said sheet to render the same thermoplastic without destroying the cellular configuration thereof;

(2) confining said sheet in a mold cavity defined by at least two mold members whereby said sheet assumes the general configuration of said cavity; and (3) simultaneously applying a partial vacuum to the opposed faces of said sheet to expand and to decrease the density of said sheet, and to bring said opposed faces into respective contiguity with said mold members.]

[6. A process as set forth in claim 5, including the additional step of cooling said sheet to solidify said sheet while maintaining said partial vacuum.]

*7. A process for forming a solidified body from a sheet of thermoplastic, closed cell, foam material having opposed faces, said method comprising the steps of*

*(1) heating said thermoplastic sheet to render the same deformable without destroying the cellular character thereof;*

*(2) positioning said sheet between opposed male and female members, said members, when brought into final forming position, defining a cavity therebetween which includes a bottom region and a side region;*

*(3) relatively moving said mold members into final forming position for engaging the sheet while said sheet is in a heated condition, and stretching said heated sheet into a configuration generally assuming the configuration of said cavity, but incompletely filling the cavity in the bottom and side regions thereof; and*

*(4) simultaneously applying vacuum to opposed faces of said stretched sheet in said bottom and side regions of the cavity for causing said sheet to expand*

*into close conformity with said mold members in said bottom and side regions for forming an article having a lower density, greater thickness and greater flexure strength than the heated sheet prior to stretching.*

*8. The process according to claim 7, including the step of cooling said sheet to rigidify it in the expanded condition.*

References Cited

The following references, cited by the Examiner, are of record in the patented file of this patent or the original patent.

UNITED STATES PATENTS

| | | | |
|---|---|---|---|
| 3,338,997 | 8/1967 | Tigner | 264—321 X |
| 3,427,372 | 2/1969 | Berner | 264—51 |
| 2,218,385 | 10/1940 | Schulze | 264—47 |
| 3,069,725 | 12/1962 | Root | 264—51 |
| 3,086,248 | 4/1963 | Culp | 264—53 |
| 3,159,693 | 12/1964 | Plymale | 264—53 |
| 3,315,018 | 4/1967 | Commeyras | 264—321 XR |

| | | | |
|---|---|---|---|
| 3,334,164 | 8/1967 | Samuels et al. | 264—90 |
| 3,167,521 | 1/1965 | Heckmaier et al. | 264—25 XR |
| 3,312,760 | 4/1967 | Berner | 264—51 |
| 3,326,443 | 6/1967 | Burkett | 229—2.5 |

FOREIGN PATENTS

| | | | |
|---|---|---|---|
| 1,305,053 | 8/1962 | France. | |
| 1,344,241 | 10/1963 | France. | |
| 645,209 | 9/1964 | Belgium | 264—321 |

OTHER REFERENCES

Koppers: Technical Manual. "Dylite Expandable Polystyrene: Thermoforming Foam Polystyrene Sheet and Polystyrene-Foam Polystyrene Laminates," Bulletin C-9-273, chapter 4c, Apr. 15, 1962, pp. 7-18. TP 1180.5755, 1962.

PHILIP E. ANDERSON, Primary Examiner

U.S. Cl. X.R.

229—2.5; 264—89, 90, 101, 321